United States Patent [19]

Murakami

[11] Patent Number: 5,675,722
[45] Date of Patent: Oct. 7, 1997

[54] PATTERN OUTPUT APPARATUS

[75] Inventor: Yutaka Murakami, Yokohama, Japan

[73] Assignee: Canon Kabushiki Kaisha, Tokyo, Japan

[21] Appl. No.: 438,879

[22] Filed: May 10, 1995

Related U.S. Application Data

[63] Continuation of Ser. No. 115,122, Sep. 1, 1993, abandoned, which is a continuation of Ser. No. 925,335, Aug. 6, 1992, abandoned, which is a continuation of Ser. No. 391,236, Aug. 9, 1989, abandoned.

[30] Foreign Application Priority Data

Aug. 19, 1988 [JP] Japan .................. 63-204675

[51] Int. Cl.⁶ .................................. G06F 15/00
[52] U.S. Cl. .................................. 395/167
[58] Field of Search .................. 395/150, 151, 395/167, 168, 169, 170, 171, 172

[56] References Cited

U.S. PATENT DOCUMENTS

| | | | |
|---|---|---|---|
| 4,031,519 | 6/1977 | Findley | 364/900 |
| 4,660,998 | 4/1987 | Tsuneki | 400/61 |
| 4,660,999 | 4/1987 | Tsuneki | 400/61 |
| 4,710,886 | 12/1987 | Heath | 364/519 |
| 4,727,497 | 2/1988 | Peters et al. | 364/518 |
| 4,763,281 | 8/1988 | Arakawa | 364/523 |
| 4,837,712 | 6/1989 | Shibamiya | 364/523 |
| 5,047,957 | 9/1991 | Ikenoue | 364/519 |

FOREIGN PATENT DOCUMENTS

| | | |
|---|---|---|
| 0317996 | 5/1989 | European Pat. Off. . |
| 0335211 | 10/1989 | European Pat. Off. . |
| 2588212 | 4/1987 | France . |
| 2182471 | 5/1987 | United Kingdom . |
| 2185608 | 7/1987 | United Kingdom . |

*Primary Examiner*—Phu K. Nguyen
*Attorney, Agent, or Firm*—Fitzpatrick, Cella, Harper & Scinto

[57] ABSTRACT

There is disclosed a pattern output apparatus capable of easily adapting to different code systems. For this purpose conversion tables for converting from different external code systems to the internal codes are provided as a detachable memory.

12 Claims, 4 Drawing Sheets

PATTERN OUTPUT APPARATUS

This application is a continuation of application Ser. No. 08/115,122, filed Sep. 1, 1993, now abandoned, which is a continuation of application Ser. No. 07/925,355, filed Aug. 6, 1992, now abandoned, which is a continuation of Ser. No. 07/391,236, filed Aug. 9, 1989, now abandoned.

BACKGROUND OF THE INVENTION

1. Field of the Invention

The present invention relates to a pattern output apparatus, and more particularly to a pattern output apparatus capable of output (display or printing) of character patterns corresponding to input character codes.

2. Description of the Related Art

In such a conventional apparatus, the input character codes are once converted into internal codes of the apparatus, and said internal codes are converted into character patterns, because this method allows easy handling of input codes of different code systems. Conventionally, the conversion to said internal codes has been conducted by a conversion program fixed in the apparatus.

However, it is not easy to use the apparatus in a still different code system if said conversion program is fixed. On the other hand, in order to respond to various code systems, there is required a larger amount of conversion programs, leading to a complicated control of the apparatus and an increased cost.

SUMMARY OF THE INVENTION

In consideration of the foregoing, an object of the present invention is to provide a pattern output apparatus not associated with the drawbacks of the conventional technology and enabling easy addition or alteration of the code system.

Another object of the present invention is to provide a pattern output apparatus capable of reading internal codes corresponding to input character codes by referring to a conversion memory, and releasing character patterns corresponding to said read internal codes.

DETAILED DESCRIPTION OF THE PREFERRED EMBODIMENTS

Now the present invention will be clarified in detail by embodiments thereof shown in the attached drawings.

Figure 1:
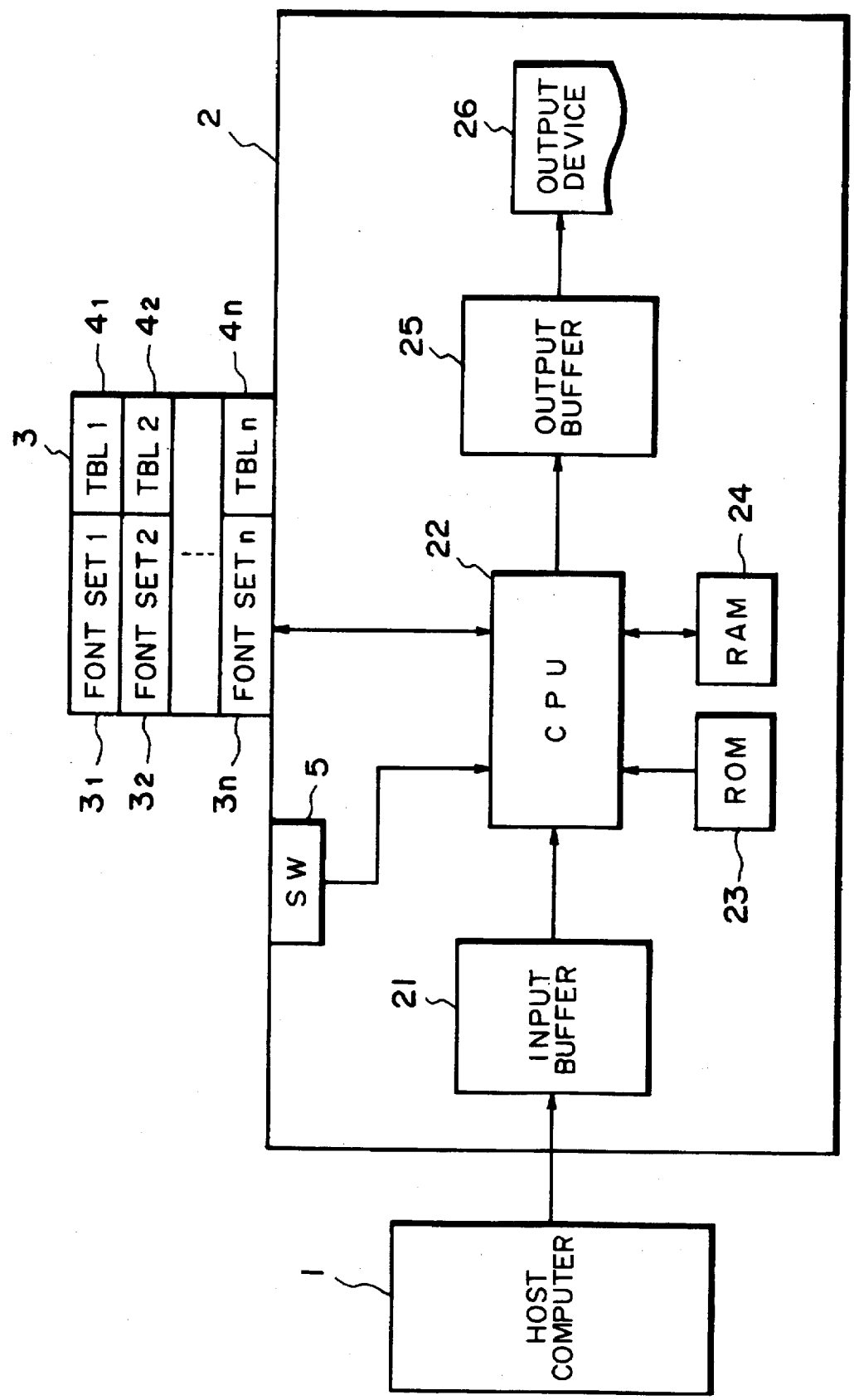
FIG. 1 is a block diagram of a printing apparatus embodying the present invention.
Figure 4:
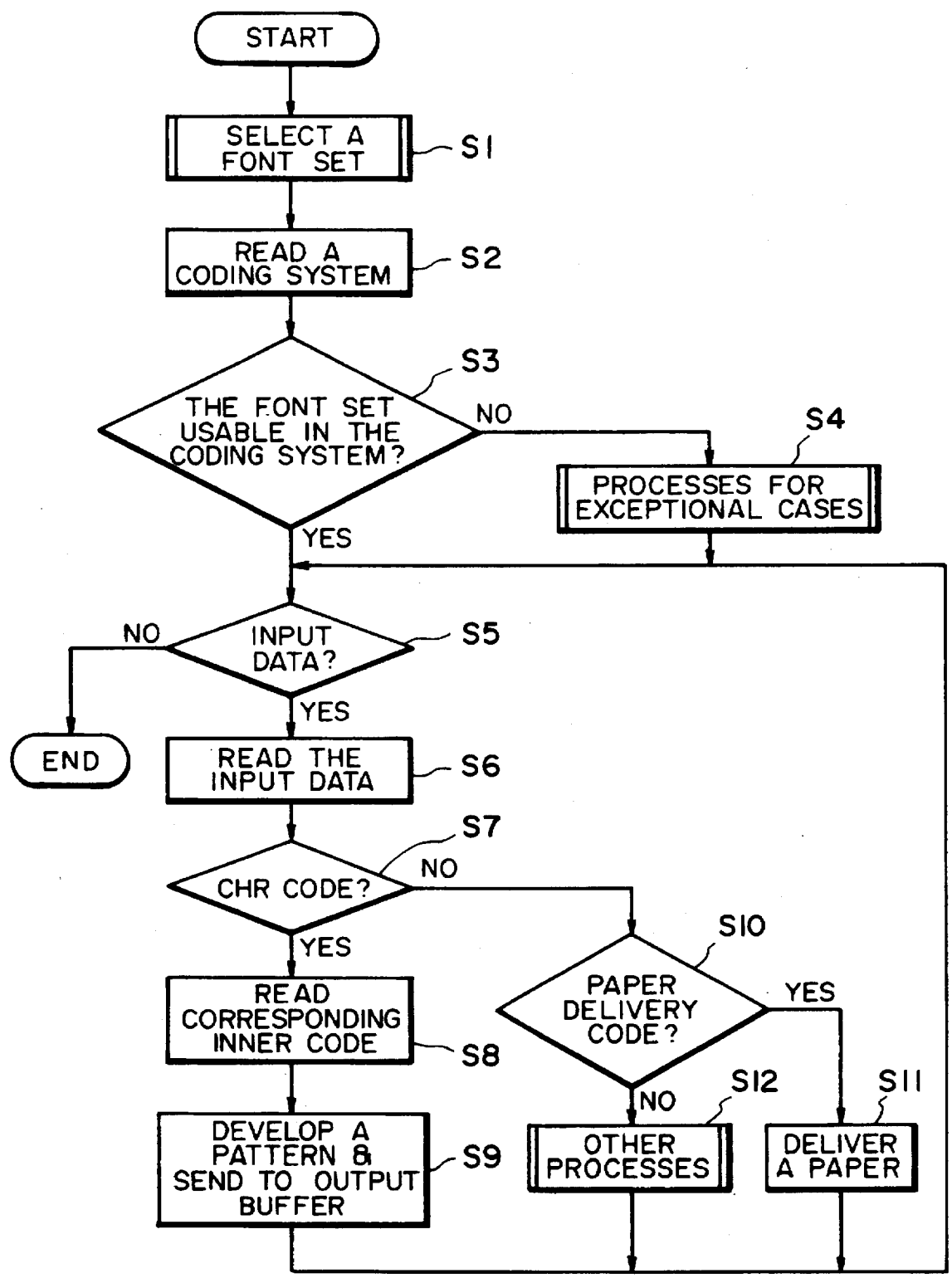
FIG. 4 is a flow chart of a printing sequence of said embodiment.

FIG. 1 is a block diagram of a printing apparatus, constituting an embodiment of a pattern output apparatus of the present invention, wherein provided are a host computer 1 for sending print data (data of characters and symbols and control data) and command data to the printing apparatus of the present embodiment; a printing apparatus 2 constituting the present embodiment; an input buffer 21 for temporarily storing the data received from the host computer; a CPU 22 for controlling the printing apparatus 2; a ROM 23 storing a print control program, shown in FIG. 4, to be executed by the CPU 22; a RAM 24 to be used as a work area of the CPU 22; an output buffer 25 in which pattern data of a page are developed by the CPU 22; and an output unit 26 for forming a visible image of the pattern data of the output buffer 25 on a sheet.

A ROM cartridge 3 is detachably provided on the printing apparatus 2. In said ROM there are provided plural font sets $3_1$–$3_n$, each containing plural internal codes and font patterns corresponding to said internal codes. Also there are provided code conversion tables $4_1$–$4_n$ respectively for the font sets 1–n. A font set selecting switch 5 is provided.

Figure 2:
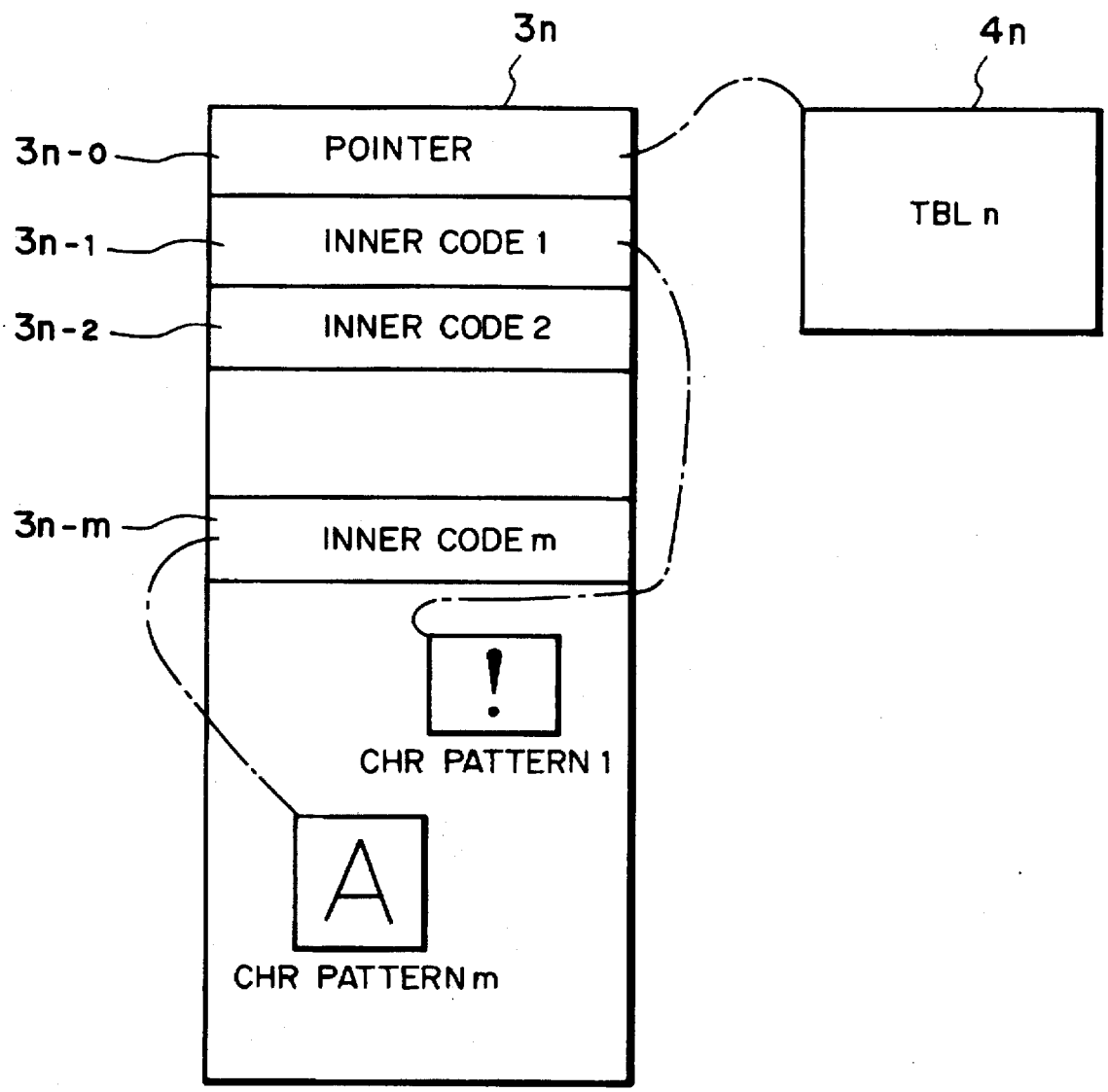
FIG. 2 is a view showing the memory structure of a font set $3n$ in the embodiment.

FIG. 2 shows the memory structure of a font set $3n$ of the present embodiment. The structure is the same for the other font sets $3_1, 3_2, \ldots$. A pointer $3n$-0 is provided for indicating the code conversion table $4n$ (TBLn). Internal codes $3n$-1–$3n$-$m$ respectively indicate the start addresses of the corresponding character patterns.

Figure 3:
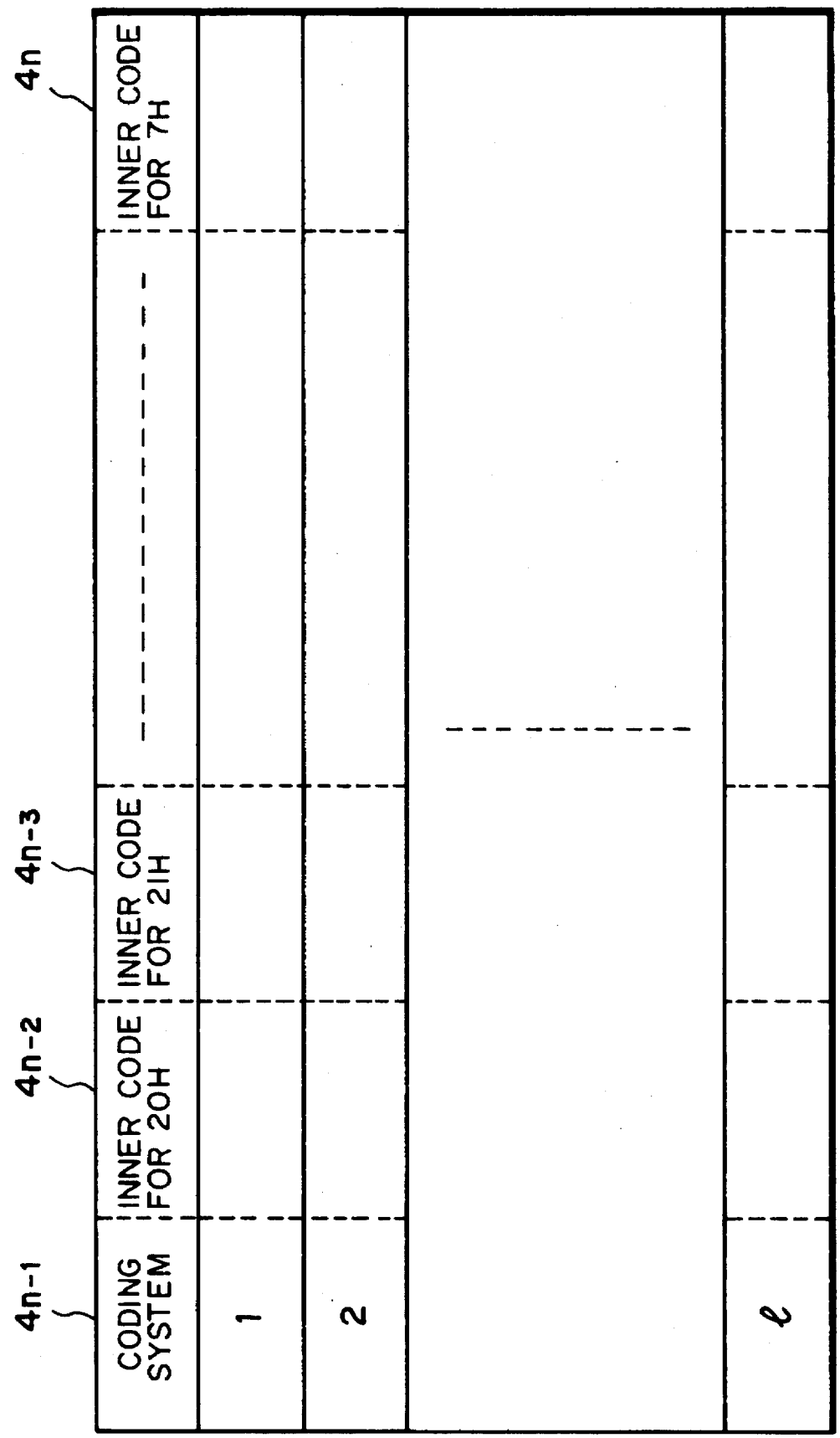
FIG. 3 is a view showing the memory structure of a code conversion table TBL $4n$ of said embodiment.

FIG. 3 shows the memory structure of a code conversion table TBL$4n$ of the present embodiment. The structure is the same for the other tables $4_1, 4_2, \ldots$. A column $4n$-1 indicates all the external code systems 1–l related to the font set n. A column $4n$-2 shows internal codes corresponding to an external code 20H (H standing for hexadecimal), and stores internal codes specific to the code systems 1–l (said codes may be mutually overlapped). A column $4n$-3 similarly stores internal codes corresponding to an external code 21H, respectively specific to the code systems 1–l. There are further provided similar columns up to an external code 7FH.

FIG. 4 is a flow chart showing the printing sequence of the present embodiment. At first a step S1 selects, for example, a font set $3n$ by the switch 5 whereby the code conversion table $4n$ is designated. The selection of the font set may also be conducted by a command (by font name or font property) from the host computer 1. A step S2 reads the column $4n$-1 for a code system. A step S3 then discriminates whether the font set $3n$ is usable with the current external code system, namely whether said external code system is registered for the font set $3n$. If not usable, a step S4 executes an exceptional process. If usable, a step S5 discriminates whether the print data are present in the input buffer 21, and, if absent, the sequence is terminated. If the print data are present, a step S6 reads said data, and a step S7 discriminates whether said data are a character code. If it is a character code, a step S8 refers to the code conversion table $4n$, thus reading an internal code corresponding, in said code system, to the character code (external code). Then a step S9 reads a character pattern corresponding to said internal code, and develops said character pattern in the output buffer 25.

On the other hand, if the step S7 discriminates that said data are not a character code, a step S10 discriminates whether said data are a sheet discharge command. If it is a sheet discharge command, a step S11 executes sheet discharge. If not, a step S12 executes another process.

In the above-explained embodiment, all the internal codes for the external character codes 20H–7FH are stored on the code conversion tables, but the present invention is not limited to such form. For example it is also possible to store the basic code system in the ROM 23 and to store other code systems in the ROM 3. In this manner it is possible to reduce the memory capacity of the ROM 3.

It is also possible to store the control program in the ROM 3 instead of the ROM 23 as in the above-explained embodiment.

What is claimed is:

1. An output control apparatus comprising:

connection means for connecting to said apparatus detachable memory means which stores a plurality of conversion tables corresponding to respective different code systems, each conversion table being used for converting a character code formed in one of the code systems and input from an external source to said apparatus into an internal code, the memory means also storing (1) a plurality of pieces of character pattern information corresponding to the respective internal codes at respective addresses, and (2) an address table which stores these addresses;

selection means for selecting a font in response to a font selection instruction;

first read means for reading one of the internal codes stored in the memory means corresponding to a character code input from the external source to said apparatus using one of the plurality of the conversion tables stored in the memory means corresponding to one of the code systems for the font selected by said selection means; and second read means for reading one of the plurality of pieces of character pattern information stored in the memory means corresponding to the one internal code read by said first read means, based on the address table stored in the memory means.

2. An apparatus according to claim 1, further comprising print means for printing data based on the one piece of character information read by said second read means.

3. An apparatus according to claim 1, further comprising an external source, said external source comprising a host computer.

4. An apparatus according to claim 1, wherein each of the plurality of conversion tables stores all internal codes corresponding to character codes formed in the corresponding one code system.

5. An apparatus according to claim 1, wherein each of the plurality of conversion tables does not store all internal codes corresponding to character codes formed in the corresponding one code system, but stores internal codes different from basic internal codes.

6. An apparatus according to claim 1, wherein the internal codes stored in the memory means include common codes between the plurality of different code systems.

7. An output control method used in an output control apparatus having a connector for connecting to the apparatus a detachable memory which stores a plurality of conversion tables corresponding to respective different code systems, each conversion table being used for converting a character code formed in one of the code systems and input from an external source to the apparatus into an internal code, the memory also storing (1) a plurality of pieces of character pattern information corresponding to the respective internal codes at respective addresses, and (2) an address table which stores these addresses, said method comprising the steps of:

selecting a font in response to a font selection instruction;

a first step of reading one of the internal codes stored in the memory corresponding to a character code input from the external source to the apparatus using one of the plurality of the conversion tables stored in the memory corresponding to one of the code systems for the selected font; and a second step of reading one of the plurality of pieces of character pattern information stored in the memory corresponding to the one internal code read in said first step, based on the address table stored in the memory means.

8. A method according to claim 7, further comprising the step of printing data based on the one piece of character information read by said second reading step.

9. A method according to claim 7, wherein the character code is input from a host computer to the apparatus.

10. A method according to claim 7, wherein each of the plurality of conversion tables stores all internal codes corresponding to character codes formed in the corresponding one code system.

11. A method according to claim 7, wherein each of the plurality of conversion tables stores does not store all internal codes corresponding to character codes formed in the corresponding one code system, but internal codes different from basic internal codes.

12. A method according to claim 7, wherein the internal codes stored in the memory means include common codes between the plurality of different code systems.

* * * * *

UNITED STATES PATENT AND TRADEMARK OFFICE
CERTIFICATE OF CORRECTION

PATENT NO. : 5,675,722
DATED : October 7, 1997
INVENTOR(S) : Murakami

It is certified that error appears in the above-identified patent and that said Letters Patent is hereby corrected as shown below:

COLUMN 1:

Line 5, "Ser. No. 07/925,355," should read --Ser. No. 07/925,335,--.

COLUMN 4:

Line 37, "stores does not store" should read --does not store--.

Signed and Sealed this

Twenty-sixth Day of May, 1998

Attest:

BRUCE LEHMAN

Attesting Officer    Commissioner of Patents and Trademarks